US011461508B2

(12) United States Patent
Bartling et al.

(10) Patent No.: US 11,461,508 B2
(45) Date of Patent: Oct. 4, 2022

(54) MEMORY PROTECTION UNIT BOUNDARY PARTITIONING BASED ON COMPILED SOFTWARE OBJECTS

(71) Applicant: Arm Cloud Technology, Inc., San Jose, CA (US)

(72) Inventors: Michael Bartling, Austin, TX (US); Christopher Haster, Austin, TX (US)

(73) Assignee: Izuma Tech, Inc., San Jose, CA (US)

( * ) Notice: Subject to any disclaimer, the term of this patent is extended or adjusted under 35 U.S.C. 154(b) by 303 days.

(21) Appl. No.: 16/885,745

(22) Filed: May 28, 2020

(65) Prior Publication Data

US 2021/0374293 A1    Dec. 2, 2021

(51) Int. Cl.
*G06F 3/00*  (2006.01)
*G06F 21/79*  (2013.01)
*G06F 21/62*  (2013.01)
*G06F 3/06*  (2006.01)

(52) U.S. Cl.
CPC ............ *G06F 21/79* (2013.01); *G06F 3/0622* (2013.01); *G06F 3/0629* (2013.01); *G06F 3/0644* (2013.01); *G06F 3/0647* (2013.01); *G06F 3/0679* (2013.01); *G06F 21/6209* (2013.01)

(58) Field of Classification Search
None
See application file for complete search history.

(56) References Cited

U.S. PATENT DOCUMENTS

2021/0209008 A1*  7/2021  Huang ............... G06F 11/3676

\* cited by examiner

*Primary Examiner* — Midys Rojas
(74) *Attorney, Agent, or Firm* — Leveque Intellectual Property Law, PC

(57) ABSTRACT

The present disclosure advantageously provides a computer-based method for partitioning software for an embedded system with a memory protection unit (MPU). Object code within a plurality of object files is converted to intermediate code. A call graph is generated based on the intermediate code. The call graph is transformed into a directed flow graph, which includes updating the call graph's node weights and directed edge weights. The directed flow graph is partitioned into a target number of MPU memory regions, which includes assigning each element of the object code to one of the MPU memory regions. Each element of the object code is relocated to a new object file that corresponds to the assigned MPU memory region. An MPU configuration object file is created that includes one or more configuration parameters for each MPU memory region.

20 Claims, 10 Drawing Sheets

MEMORY PROTECTION UNIT BOUNDARY PARTITIONING BASED ON COMPILED SOFTWARE OBJECTS

BACKGROUND

The present disclosure relates to computer systems. More particularly, the present disclosure relates to software for embedded computer systems.

General purpose computer systems that execute full Operating Systems (OSs) such as Windows, MacOS, etc. typically include large memories and at least one high-performance processor that has a Memory Management Unit (MMU). MMUs provide isolated, virtual memory address spaces for processes that are individually loaded and run by the OS. The isolation provided by an MMU typically allows the OS to shut down a process should it malfunction or become infected by malware.

Embedded computer systems typically execute processes that have real-time computing requirements, which are much better served by small memories and low-power, moderate-performance Central Processing Units (CPUs) executing Real Time Operating Systems (RTOSs). Many CPUs include Memory Protection Units (MPUs), which are not capable of creating isolated, virtual memory address spaces. Instead, MPUs partition the physical memory space to create memory regions which may be isolated, to a certain extent, from one another. Similar to an MMU, the isolation provided by an MPU may allows the OS to shut down a process should it malfunction or become infected by malware.

Unfortunately, programming an MPU to create memory regions is notoriously tricky, and many developers choose to avoid it all together in their embedded software projects to the detriment of the security and build stability of the embedded system.

DETAILED DESCRIPTION

Figure 1:
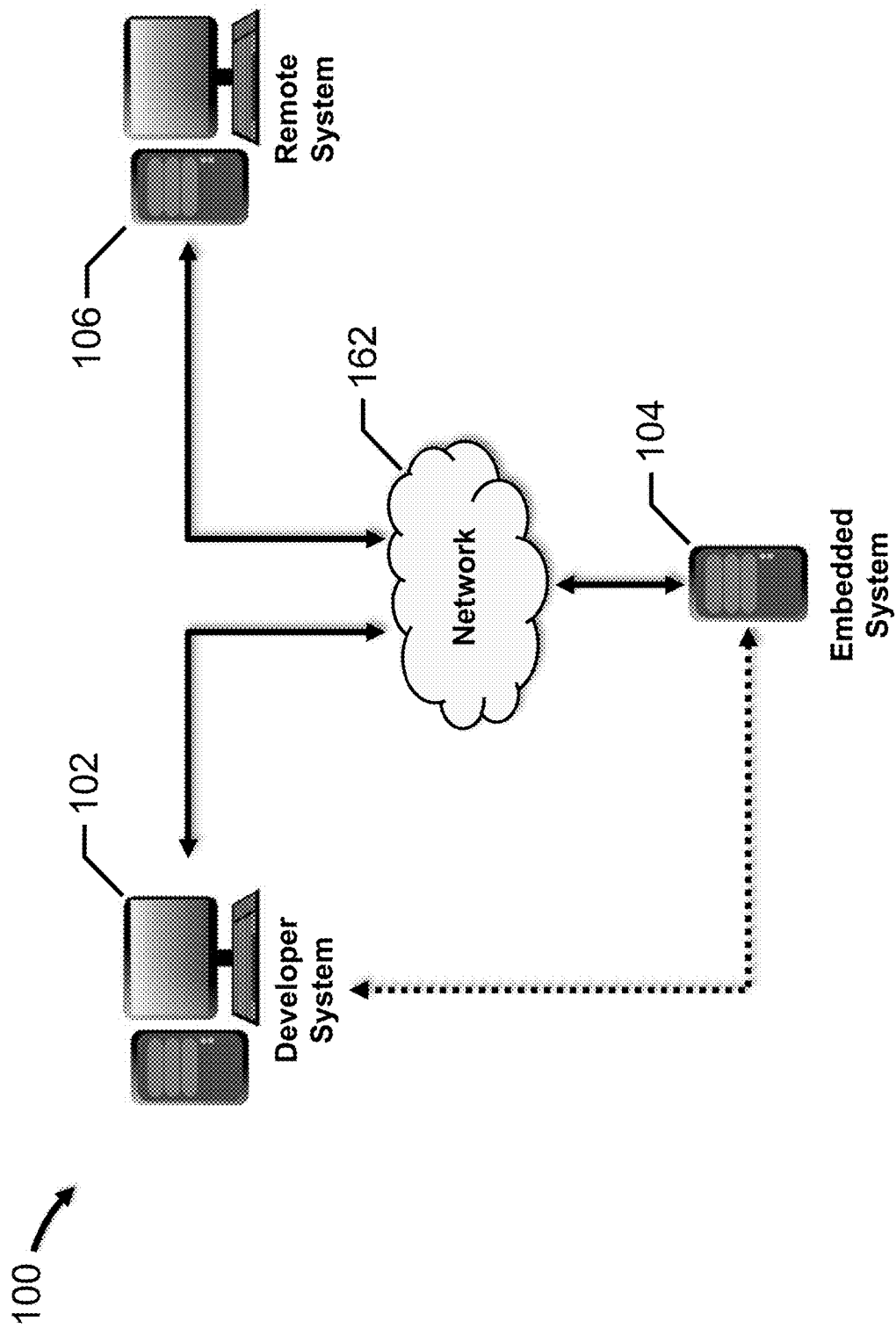
FIG. 1 depicts a block diagram of a system, in accordance with embodiments of the present disclosure.

Embodiments of the present disclosure will now be described with reference to the drawing figures, in which like reference numerals refer to like parts throughout.

An embedded system typically integrates one or more custom-developed applications with software from multiple parties or service providers, such as, for example, device drivers, communications stacks, operating systems, etc., into monolithic software (e.g., a single executable binary file). Accordingly, a particular application must trust all of the software executed by the embedded system, including software provided by competing parties. Additionally, applications may have different levels of trust, update lifecycles, execution frequencies, etc., which also complicates the initial development and subsequent lifecycle support for the embedded software. Programming the MPU of an embedded system to create multiple memory regions provides many advantages in this context.

Embodiments of the present disclosure advantageously partition software for an embedded system with an MPU into a target number of MPU memory regions (or partition number) based on the software's object code. The software is partitioned after the source code has been compiled into object code and before the object code has been linked into an executable file. Advantageously, the source code does not need to be recompiled after the object code has been partitioned.

More particularly, the partitioning process determines to which MPU memory region each element of each object file is to be assigned, and then relocates each element of each object file to a new object file that corresponds to the assigned MPU memory region. Generally, each new object file is loaded in the corresponding MPU memory region. This partitioning process advantageously isolates, to a large extent, the software components in each MPU memory region from one another. This feature improves, inter alia, the security of the embedded system.

Additionally, as the embedded software is updated over time, the number and configuration of the MPU memory regions remain stable across software builds, so that small changes in source code yield small changes in the number and configuration of the MPU memory regions. This feature improves, inter alia, the build stability of the embedded system.

In one embodiment, a computer-based method for partitioning software for an embedded system with a memory protection unit (MPU) includes converting object code within a plurality of object files to intermediate code; generating a call graph based on the intermediate code; transforming the call graph into a directed flow graph including updating the call graph's node weights and directed edge weights; partitioning the directed flow graph into a target number of MPU memory regions, including assigning each element of the object code to one of the MPU memory regions; relocating each element of the object code to a new object file that corresponds to the assigned MPU memory region; and creating an MPU configuration object file that includes one or more configuration parameters for each MPU memory region. The call graph includes a plurality of nodes and a plurality of directed edges, each node represents a function in the intermediate code, each directed edge connects a source node to a terminal node to represent a source function calling a terminal function, each node has a weight, and each directed edge has a weight.

FIG. 1 depicts a block diagram of system 100, in accordance with embodiments of the present disclosure.

System 100 includes developer system 102 and embedded system 104 coupled to network 162. In certain embodiments, developer system 102 may be directly coupled to embedded system 104 via a wired or wireless connection. Generally, developer system 102 generates a series of shuffled (or partitioned) compiled objects (*.o) files based on a module configuration and a series of compiled objects (*.o files) that are created by a standard compiler, from which an executable image for embedded system 104 may be generated using a standard linking process.

In certain embodiments, developer system 102 may include remote system 106. In these embodiments, developer system 102 may execute a server application, such as an application server, a web server, an HTTP server, etc., to which remote system 106 may connect through network 162. Remote system 106 may access relevant applications executed by developer system 102 using a client-server architecture.

Figure 2:
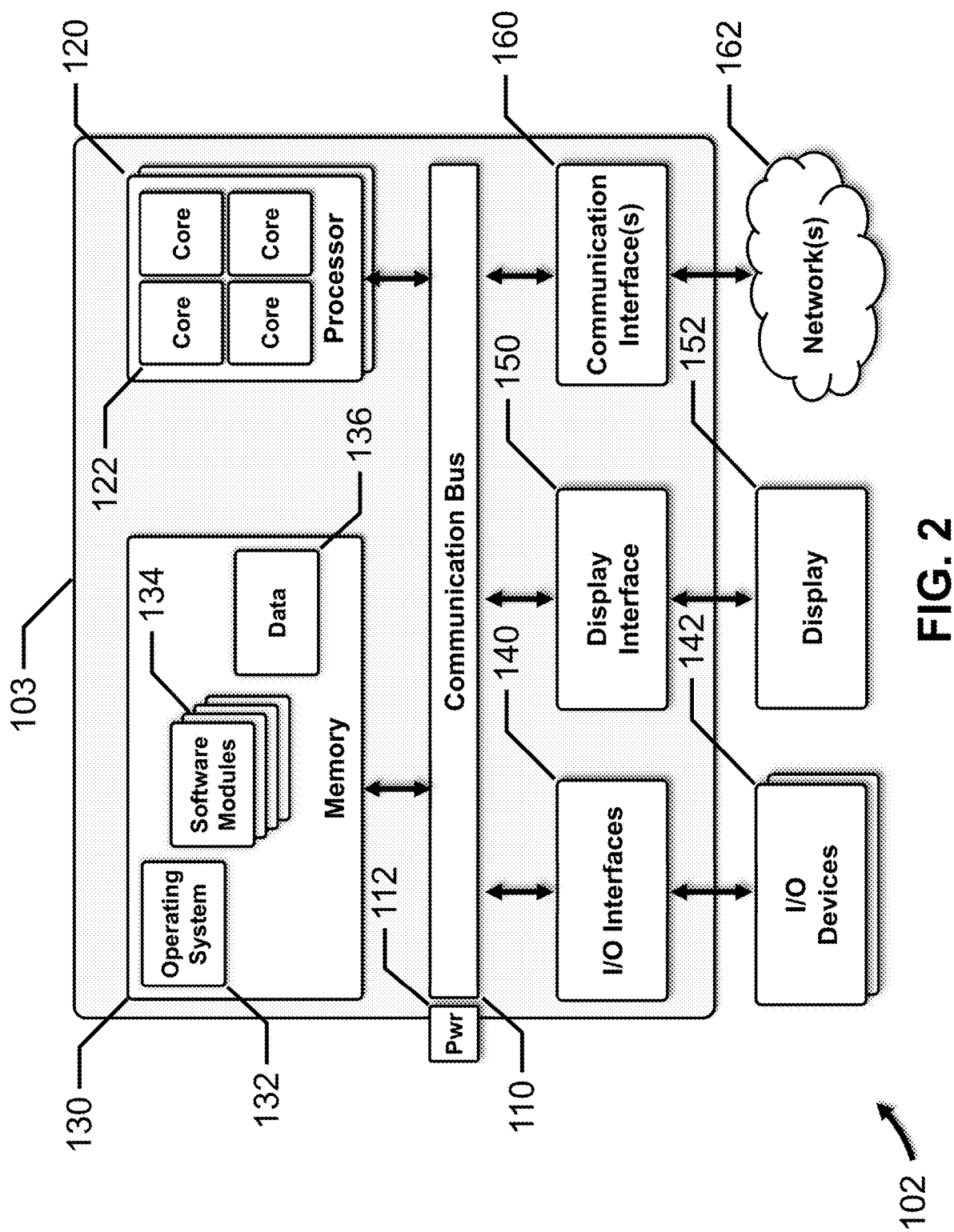
FIG. 2 depicts a block diagram of a developer system, in accordance with embodiments of the present disclosure.

FIG. 2 depicts a block diagram of developer system 102, in accordance with embodiments of the present disclosure.

Developer system 102 generally includes computer 103, I/O devices 142 and display 152. Computer 103 may include, inter alia, communication bus 110 coupled to processor 120, memory 130, I/O interfaces 140, display interface 150, and one or more communication interfaces 160. Generally, I/O interfaces 140 are coupled to I/O devices 142 using a wired or wireless connection, display interface 150 is coupled to display 152, and communication interface 160 is connected to network 162 using a wired or wireless connection.

Processor 120 includes one or more general-purpose or application-specific microprocessors that executes instructions to perform control, computation, input/output, etc. functions for computer 103. Processor 120 may include a single integrated circuit, such as a micro-processing device, or multiple integrated circuit devices and/or circuit boards working in cooperation to accomplish the functions of processor 120. Additionally, processor 120 may include multiple processing cores, as depicted in FIG. 2. Generally, computer 103 may include one or more processors 120, each containing one or more processing cores as well as various other modules.

In some embodiments, computer 103 may include 2 processors 120, each containing multiple processing cores. For example, one processor 120 may be a high performance processor containing 4 "big" processing cores, e.g., Arm Cortex-A73, Cortex-A75, Cortex-A76, etc., while the other processor 120 may be a high efficiency processor containing 4 "little" processing cores, e.g., Arm Cortex-53, Arm Cortex-55, etc. In this example, the "big" processing cores include a memory management unit (MMU).

Generally, storage element or memory 130 stores instructions for execution by processor 120 and data. Memory 130 may include a variety of non-transitory computer-readable medium that may be accessed by processor 120. In various embodiments, memory 130 may include volatile and nonvolatile medium, non-removable medium and/or removable medium. For example, memory 130 may include any combination of random access memory (RAM), DRAM, SRAM, ROM, flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for computer 103. Software modules 134 provide various functionality, including that described by embodiments of the present disclosure. Data 136 may include data associated with software modules 134. In certain embodiments, software modules 134 may include an application server, a web server, an HTTP server, etc., to provide remote connectivity for remote system 106.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to computer 103 and/or output from computer 103. As discussed above, I/O devices 142 are operably connected to computer 103 using a wired and/or wireless connection. I/O devices 142 may include a local processor coupled to a communication interface that is configured to communicate with computer 103 using the wired and/or wireless connection. For example, I/O devices 142 may include a keyboard, mouse, touch pad, joystick, etc.

Display interface 150 is configured to transmit image data from computer 103 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

In certain embodiments, remote system 106 may include substantially the same components as developer system 102, such as, for example, computer 103, I/O devices 142 and display 152. Computer 103 includes communication bus 110 coupled to processor 120, memory 130, I/O interfaces 140, display interface 150, and one or more communication interfaces 160. Software modules 134 include one or more applications that connect to developer system 102, such as, for example, a web browser, a client application, etc.

Figure 3:
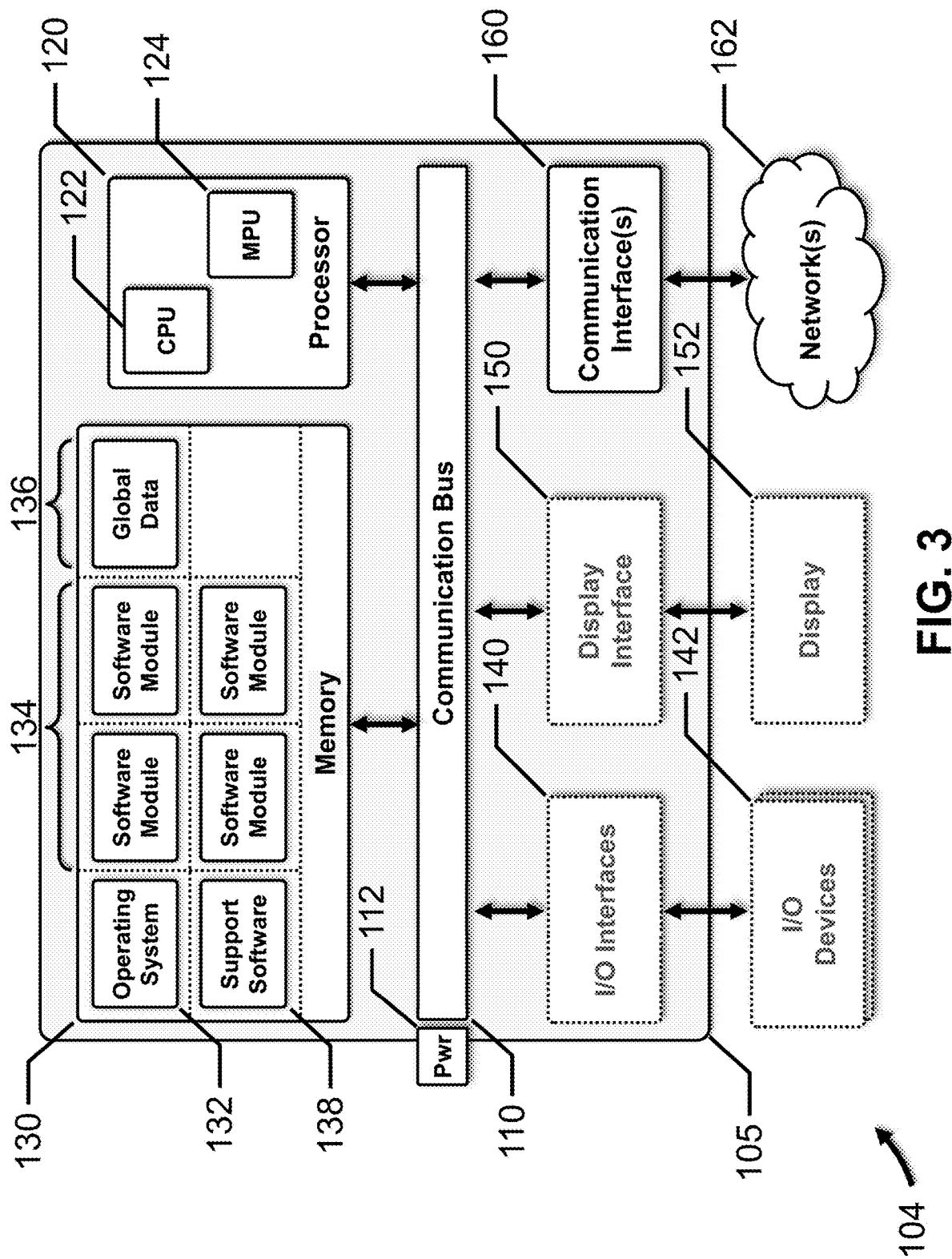
FIG. 3 depicts a block diagram of an embedded system, in accordance with embodiments of the present disclosure.

FIG. 3 depicts a block diagram of embedded system 104, in accordance with embodiments of the present disclosure.

Generally, embedded system 104 includes computer 105, I/O devices 142 and display 152. Computer 105 includes communication bus 110 coupled to processor 120, memory 130, I/O interfaces 140, display interface 150, and one or more communication interfaces 160. Generally, I/O interfaces 140 are coupled to I/O devices 142 using a wired or wireless connection, display interface 150 is coupled to display 152, and communication interface 160 is connected to network 162 using a wired or wireless connection. In some embodiments, certain components of computer 105 are implemented as system-on-chip (SoC); in other embodiments, computer 105 may be hosted on a traditional printed circuit board, motherboard, etc.

In many embodiments, one or more of the components depicted in FIG. 3 may not be present, such as, for example, I/O interfaces 140, I/O devices 142, display interface 150, display 152, etc. Additionally, certain components, when present, may be optimized based on various design constraints, such as, for example, power, area, etc.

Communication bus 110 is a communication system that transfers data between processor 120, memory 130, I/O interfaces 140, display interface 150, communication interface 160, as well as other components not depicted in FIG. 3. Power connector 112 is coupled to communication bus 110 and a power supply (not shown). In certain embodiments, communication bus 110 is a network-on-chip (NoC).

Processor 120 includes is a general-purpose or application-specific microprocessor, microcontroller or CPU 122 that executes instructions to perform various functions for computer 105, such as, for example, control, computation, input/output, etc. In addition, processor 120 may execute computer programs or modules, such as operating system 132, software modules 134, etc., stored within memory 130. Processor 120 may include a single integrated circuit, such as a micro-processing device, or multiple integrated circuit devices and/or circuit boards working in cooperation to accomplish the functions of processor 120.

Processor 120 also includes MPU 124, which cooperates with memory 130 to provide, inter alia, protected memory regions (depicted, for example, by the dotted lines in memory 130), access permissions, etc. MPU 124 may include a programmable-priority fault handler to accommodate memory region mismatches and permission violations. Additionally, processor 120 may also include other components, such as, for example, one or more memory caches, communication bus interface(s), interrupt controllers, one or more coprocessors, such as a floating-point unit (FPU), a digital signal processor (DSP), etc.

Generally, processor 120 may be a processor that is optimized for embedded systems applications, such as, for example, the Arm Cortex-M3 processor, the Arm Cortex-M4 processor, the Arm Cortex-M7 processor, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), DRAM, SRAM, ROM, flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for computer 105. Software modules 134 provide various functionality. Data 136 may include global or shared data associated with operating system 132, software modules 134, etc., as well as local data for each application. Support software 138 may include middleware, device drivers, communication protocol stacks, encryption/decryption etc.

I/O interfaces 140, when present, are configured to transmit and/or receive data from I/O devices 142, as discussed above. Similarly, display interface 150, when present, is configured to transmit image data from computer 105 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

Figure 4:
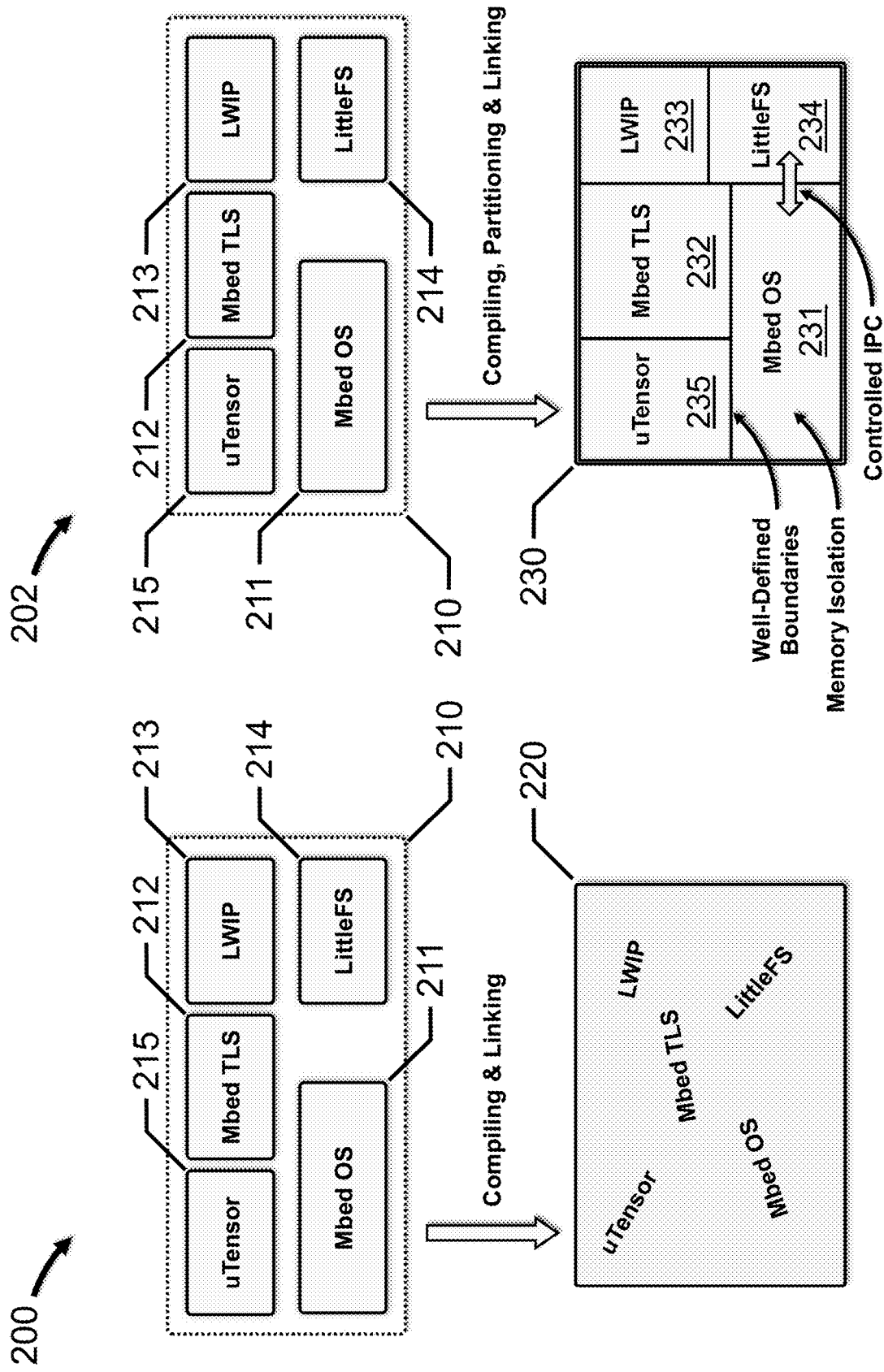
FIG. 4 depicts block diagrams for software development processes for an embedded system, in accordance with embodiments of the present disclosure.

FIG. 4 depicts software development process block diagrams 200 and 202 for an embedded system, in accordance with embodiments of the present disclosure.

Software development process block diagram 200 depicts an example of a typical embedded software development process in which software modules 210 are written, compiled and linked into monolithic software 220. Generally, a software module 210 includes one or more source code files (e.g., *.c), header files (*.h), etc. In this example, software modules 210 include Mbed OS module 211 (an embedded operating system), Mbed TLS module 212 (an embedded networking protocol module including a secure sockets layer, or SSL, and transport layer security, or TLS), LWIP module 213 (a lightweight transmission control protocol/internet protocol, or TCP/IP, module), LittleFS module 214 (an embedded file system), and uTensor module 215 (extremely light-weight machine learning inference application). Mbed OS module 211, Mbed TLS module 212, LWIP module 213, LittleFS module 214 and uTensor module 215 have natural software boundaries, as suggested by the spaces surrounding each software module 210.

During the compiling and linking stages, the natural software boundaries between the individual software modules 210 are lost, as suggested by the random orientation and location of the software module names depicted within monolithic software 220. The loss of software boundaries within monolithic software 220 impairs, inter alia, the security and build stability of the embedded system. For non-embedded systems, software boundaries may be re-imposed on portions of the executable software (i.e., binary modularization) by various techniques, such as, for example, Unix/Linux processes, shared libraries, containers, virtual machines, etc. Unfortunately, these techniques are not available to embedded systems.

For embedded systems, binary modularization may be achieved, at least in part, by programming MPU 124 to create a number of memory regions for software modules 210. For example, a different memory region may be created for each software module. In another example, a memory region may be created for one or more software modules. In a further example, some memory regions may be created for certain software modules, while other memory regions may be created for multiple software modules. In many embodiments, memory regions may be created for different groups of compiled objects that are created from software modules 210.

More particularly, MPU 124 includes a number of programmable registers that store configuration data that defines from zero memory regions up to a maximum number of memory regions (e.g., M). For example, MPU 124 may support up to 8 memory regions, up to 16 memory regions, etc. Each memory region has a starting address, a size and access parameters, such as Read-Only (RO), Read/Write (RW), eXecute Never (XN), etc. For example, the XN attribute enables the separation of code (executable regions) and data (non-executable regions). Generally, each memory region may store program code or data that are accessible in a particular way, such as, for example, application code (RO), global data (RW, XN), etc. If a task attempts to access a memory region that is not permitted, MPU 124 generates a Memory Management Fault (MemManage) exception. An MMF invokes an MemManage handler which may stop the offending task, initiate recovery action(s), etc.

Software development process block diagram 202 depicts a novel embedded software development process in which software modules 210 are written, compiled, partitioned and linked into partitioned software 230. Software modules 210 include Mbed OS module 211, Mbed TLS module 212, LWIP module 213, LittleFS module 214 and uTensor module 215, which have natural software boundaries (as suggested by the spaces surrounding each software module 210).

Advantageously, certain embodiments of the novel partitioning method may preserve the natural software boundaries between the individual software modules within partitioned software 230, as suggested by the deliberate orientation and location of the software modules depicted within partitioned software 230, i.e., Mbed OS object(s) 231, Mbed TLS object(s) 232, LWIP object(s) 233, LittleFS object(s) 234, and uTensor object(s) 235. In this example, the compiled object(s) from each software module 210 is assigned to a different MPU memory region. Other MPU memory region assignments are also contemplated, such as, for example, assigning Mbed TLS object(s) 232 and LWIP object(s) 233 to the same MPU memory region, and assigning Mbed OS object(s) 231, LittleFS object(s) 234 and uTensor object(s) 235 to different MPU memory regions, etc.

Embodiments of this novel partitioning method provide many advantages, such as, for example, well-defined boundaries, MPU-enforced isolation, controlled inter-process communications (IPC), partial firmware updates, TrustZone security boundaries, code compression, on-the-fly decompression, dynamic loading, programming language interoperability, Capability Hardware Enhanced RISC Instructions (CHERI) capability-based pointers, System Security Integration Through Hardware and Firmware (SSITH) system security, WebAssembly sandboxing, multi-process +single-thread models, processor multi-tenancy, verified instruction sub-sets, and more.

Figure 5:
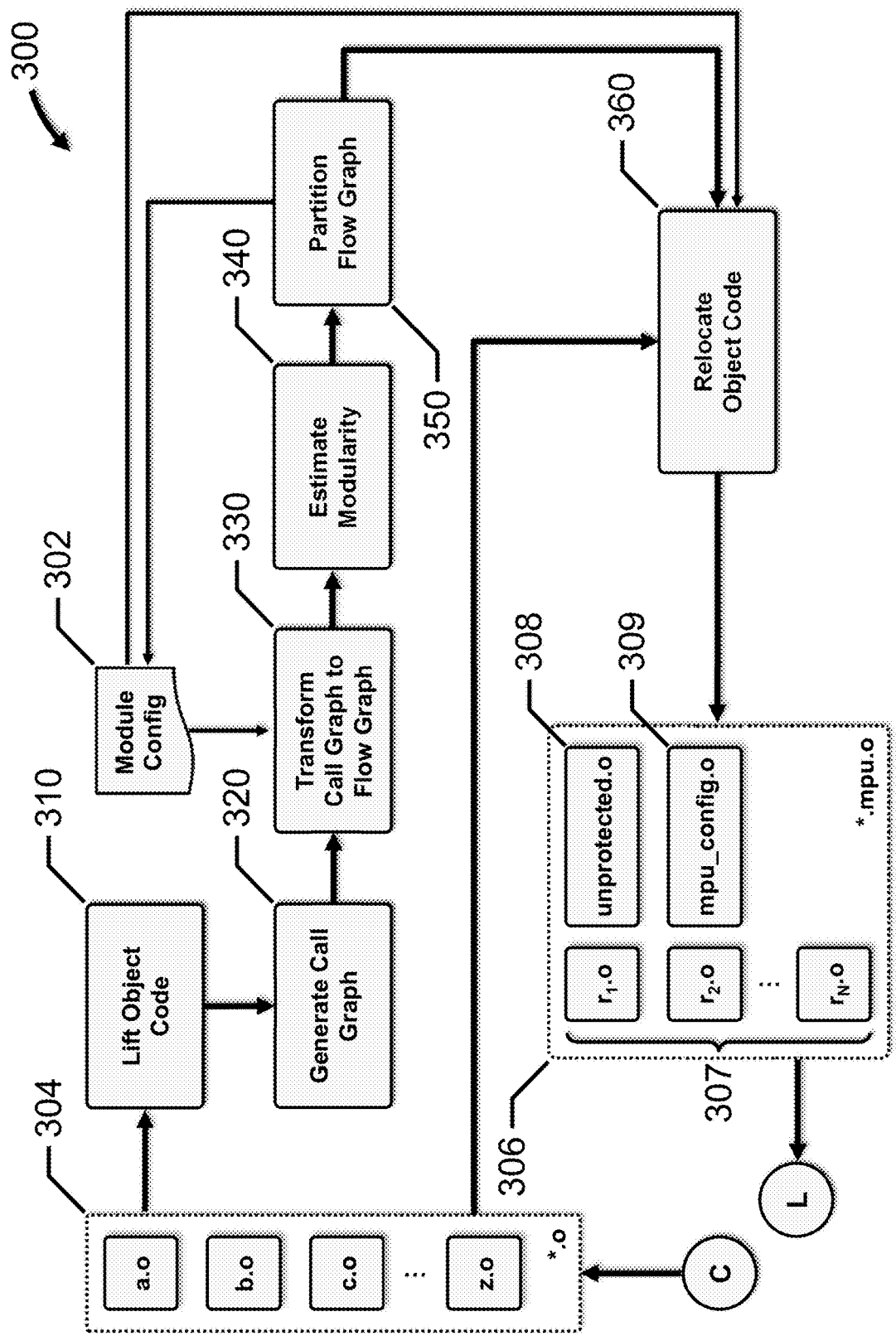
FIG. 5 depicts a flow diagram for a software partitioning process for an embedded system, in accordance with embodiments of the present disclosure.

FIG. 5 depicts a flow diagram 300 for a software partitioning process for an embedded system, in accordance with embodiments of the present disclosure.

An embedded software developer typically uses a software development kit (SDK) to write, compile and link embedded software for a particular hardware platform. Source code for an embedded software project is written in one or more programming languages, such as, for example, C, C++, Python, JavaScript, etc., and stored as a series of source code files (e.g., *.c files, *.h files) that are organized into one or more software modules. The source code files for each software module are compiled into one or more object files (i.e., *.o files). Each object file contains object code, which is a sequence of statements or instructions in a computer language, such as, for example, a machine code language, a register transfer language (RTL), etc. An object file may also contain information that is useful for linking and debugging the source code, such as, for example, program symbols and other symbolic data, relocation data, etc. Typically, the object files created from the source code files are linked together, along with statically-linked libraries, to create a single executable file for the embedded system.

The output of the compiling stage is represented by the entry point "C" in flow diagram 300. Object file series 304 includes a series of object files, such as, for example, "a.o," "b.o," "c.o," etc., which generally correspond to a series of source code files, such as, for example, "a.c," "b.c," "c.c," etc. In many embodiments, the object files may be stored in executable and linkable format (ELF). The object files within object file series 304 may be provided by the compiler in any order or sequence.

Embodiments of the present disclosure advantageously partition software for an embedded system into a number of MPU memory regions (or partitions) based on the software's object code. The software is partitioned after the source code has been compiled into object code and before the object code has been linked into an executable file. Advantageously, the source code does not need to be recompiled after the object code has been partitioned.

Module configuration file 302 includes a partition number (e.g., N) representing the target number of MPU memory regions into which the software is to be partitioned. Generally, N is less than the maximum number of MPU memory regions that is supported by MPU 124. Module configuration file 302 also includes a blacklist of functions that should not be included in any of the MPU memory regions determined by the partitioning process. Instead, the blacklist functions will be included in a separate, unprotected MPU memory region. The blacklist functions may include, for example, handwritten assembly code, frequently-accessed functions, etc. Module configuration file 302 is initialized with the partition number N, i.e., the target number of MPU memory regions into which the software is to be partitioned, and an initial blacklist of functions (if known), and is updated by the process described at 350, discussed below.

At 310, the object code within each object file in object file series 304 is lifted to a higher level representation, such as, for example, a language-independent intermediate representation (IR), by converting the object code into intermediate code. The intermediate code includes both function calls (i.e., function names) and accesses to global or shared variables (i.e., global or shared variable names). For example, converting the object code to intermediate code may be accomplished by a retargetable decompiler, such as, for example, a machine code decompiler (e.g., RetDec). Alternatively, converting the object code to intermediate code may be performed by the original compiler, and then provided as an intermediate file series along with object file series 304.

At 320, a call-graph, representing the calling relationships between subroutines and accesses to global or shared variables, is generated based on the intermediate code. Each node in the call graph represents a function or a global variable; in other words, each node represents an element in the intermediate code or the object code. Each directed edge (directional arrow) between a source node and a terminal node indicates either that the source function calls the terminal function, or that the source function accesses a global or shared variable.

In alternative embodiments, the object code may be lifted to a high-level representation, such as, for example, pseudo-code, C code, etc., by converting the object code into source code. In these embodiments, the call graph is constructed based on the source code.

Figure 6A:
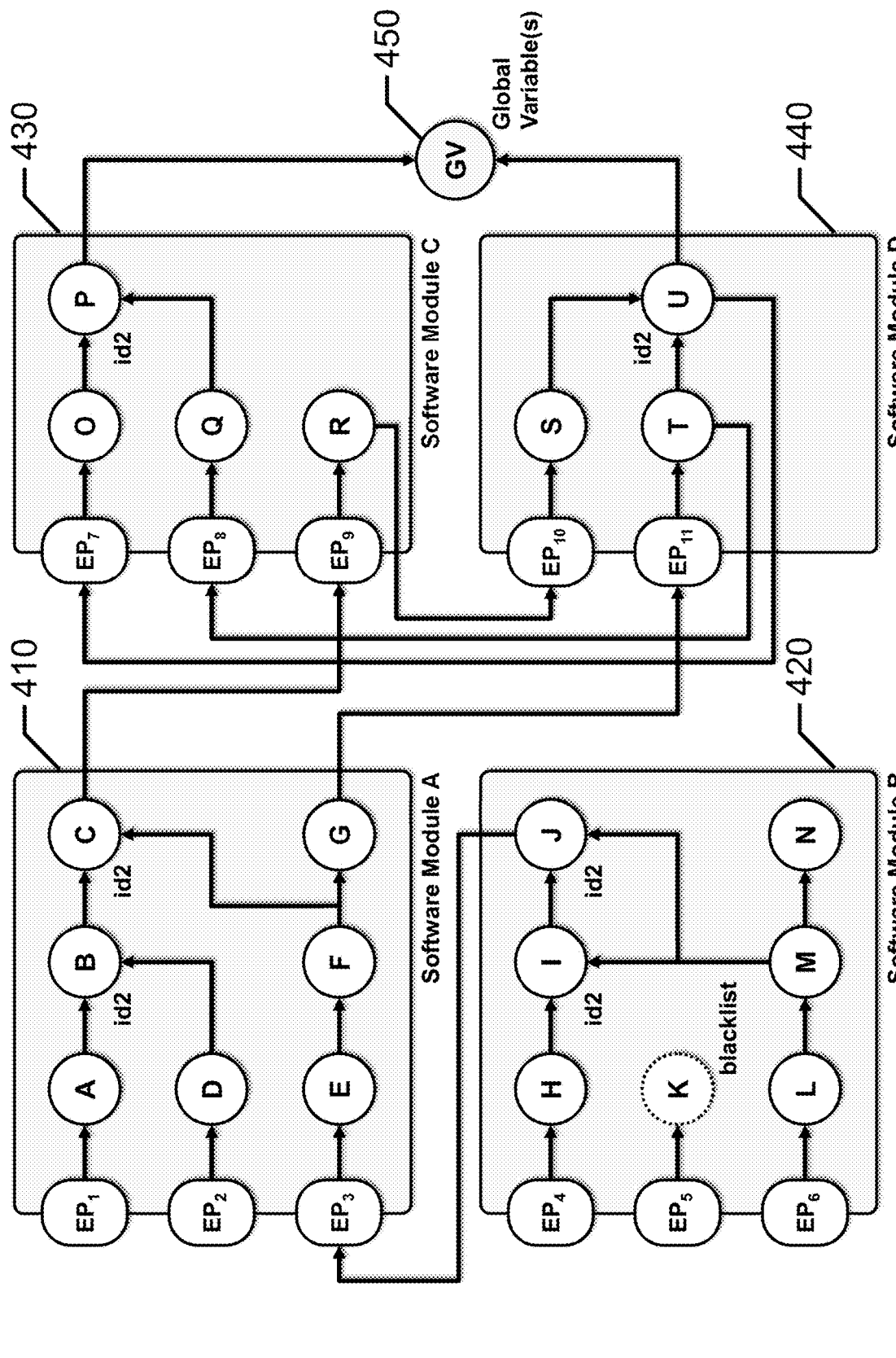
FIGS. 6A and 6B depict call graphs, in accordance with embodiments of the present disclosure.

FIG. 6A depicts a call graph 400, in accordance with embodiments of the present disclosure.

Call graph 400 is an example of a simple call graph, and is not intended to limit the scope of the present disclosure. Call graph 400 includes four software modules, i.e., software module A 410, software module B 420, software module C 430 and software module D 440, and one or more global variables (GV) 450. There are 22 nodes and 24 directed edges. Generally, the object file "a.o" is the compiled version of software module A 410, the object file "b.o" is the compiled version of software module B 420, the object file "c.o" is the compiled version of software module C 430, and the object file "d.o" is the compiled version of software module D 440. GV 450 includes all of the global variables that are accessed within the various software modules.

Software module A 410 includes seven functions or procedures, i.e., function A, function B, function C, function D, function E, function F and function G, and three entry points (EPs), i.e., $EP_1$, $EP_2$ and $EP_3$. Entry point 1 provides access to function A. Function A calls function B. Function B calls function C. Function C calls an external function in software module C 430 that is accessed through entry point 9. Entry point 2 provides access to function D, and function D calls function B. The "in degree" for function B is 2, which indicates that two different functions call function B. Entry point 3 provides access to function E. Function E call function F. Function F calls function C and function G. Function G calls an external function in software module D 440 that is accessed through entry point 11. The "in degree" for function C is 2.

Software module B 420 includes seven functions or procedures, i.e., function H, function IB, function J, function K, function L, function M and function N, and three entry points (EPs), i.e., $EP_4$, $EP_5$ and $EP_6$. Entry point 4 provides access to function H. Function H calls function I. Function I calls function J. Function J calls an external function in software module A 410 that is accessed through entry point 3. Entry point 5 provides access to function K. Entry point 6 provides access to function L. Function L call function M. Function M calls function I, function J and function N. The "in degree" for function I and function J is 2.

Software module C 430 includes four functions or procedures, i.e., function O, function P, function Q and function R, and three entry points, i.e., EPS, $EP_8$ and $EP_9$. Entry point 7 provides access to function O. Function O calls function P. Function P accesses one or more GV 450. Entry point 8 provides access to function Q. Function Q calls function P. The "in degree" for function P is 2. Entry point 9 provides access to function R. Function R calls an external function in software module D 440 that is accessed through entry point 10.

Software module C 430 includes three functions or procedures, i.e., function S, function T and function U, and two entry points, i.e., $EP_{10}$ and $EP_{11}$. Entry point 10 provides access to function S. Function S calls function U. Function U accesses one or more GV 450. Entry point 11 provides access to function T. Function T calls function U. The "in degree" for function U is 2.

Figure 6B:
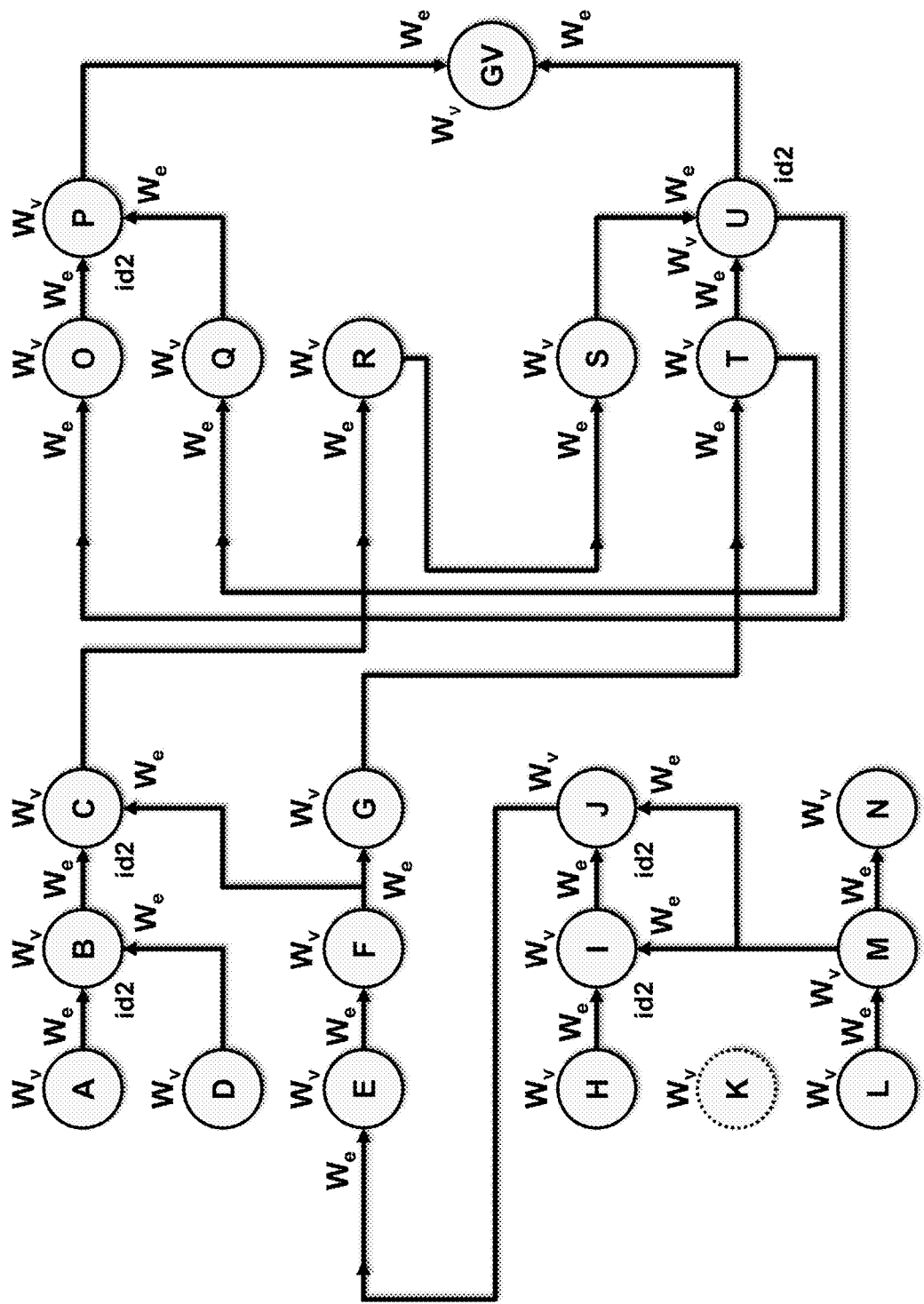

FIG. 6B depicts call graph 402, in accordance with embodiments of the present disclosure. Each node or vertex (i.e., function A, function B, function C, etc.) has been assigned a default weight $W_v$, while each directed edge has been assigned a default weight $W_e$.

At 330, the call graph is transformed into a directed flow graph, which includes updating the node (vertex) weights and the directed edge weights.

In one embodiment, each directed edge weight in directed flow graph 500 is updated based on the sum of the terminal node's input parameter size (in bytes) plus the terminal node's "in degree." For example, if function B within software module 410 receives three input parameters, each of which is a 32-bit (4 byte) integer, and if function B is called from functions A and D from software module A 410, then each directed edge leading to function B, i.e., $W_{AB}$ and $W_{DB}$, will have a weight equal to the total number of bytes required by the input parameters (i.e., 3*4=12) plus the number of functions that call function B (i.e., 2). For this example, $W_{AB}$ and $W_{DB}$ both equal 14. To determine the actual size in bytes that each input parameter occupies in a particular computer's memory, such as embedded system 104, the C function "sizeof(var)" may be used by MBP module 134.

Weighting in this fashion advantageously captures both the cost of potentially copying data across MPU memory regions and an estimate of the frequency of access for each function and global variable. Additionally, the delta-perturbation associated with each directed edge weight (if any), stored in the module configuration file 302, is added to the above-calculated weight value. The delta-perturbation regularizes the resulting MPU memory regions across software builds by imposing a cost on moving a node (vertex) to a different memory region. A low value for the delta-perturbation imposes a relatively lower cost, while a high value imposes a relatively higher cost.

Similarly, each node (vertex) weight is set to the size of the object code of the represented function in bytes plus the delta-perturbation associated with the function stored in the module configuration file 302.

Nodes (vertices) corresponding to blacklist functions may be removed if they are terminal nodes, or, alternatively, the directed edge weights leading to these nodes (vertices) may be set to $-$infinity ($-\infty$) and the vertex weights set to infinity ($\infty$). For example, function K from software module B 420 is a blacklist function whose node weight, $W_K$, that has been removed from directed flow graph 500.

Figure 7:
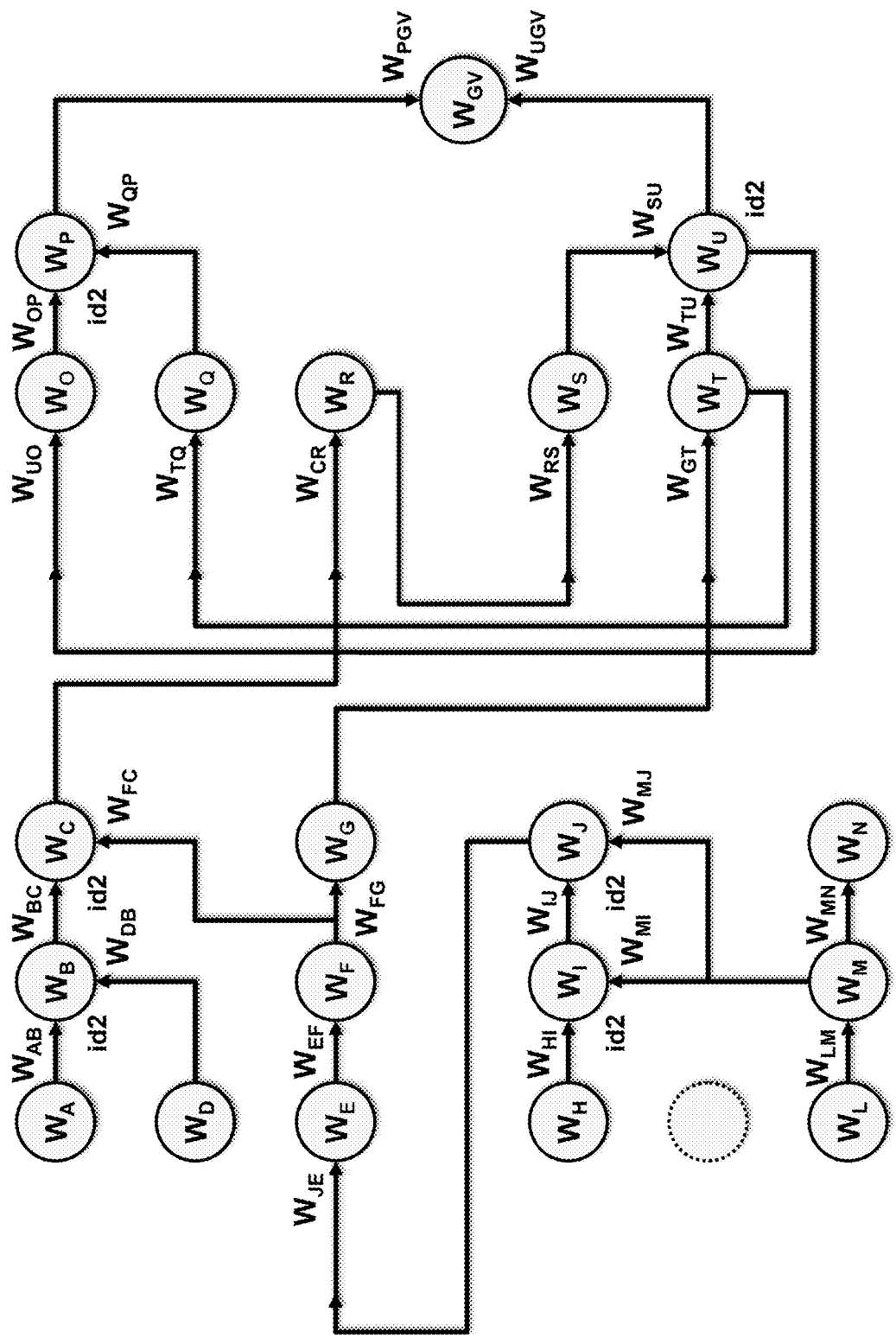
FIG. 7 depicts a directed call graph, in accordance with embodiments of the present disclosure.

FIG. 7 depicts a directed flow graph 500, in accordance with embodiments of the present disclosure. Directed flow graph 5000 includes 21 node (vertex) weights, i.e., $W_A$, $W_B$, $W_C$, $W_D$, $W_E$, $W_F$, $W_G$, $W_H$, $W_I$, $W_J$, $W_L$, $W_M$, $W_M$, $W_N$, $W_O$, $W_P$, $W_Q$, $W_R$, $W_S$, $W_T$ and $W_{GV}$ ($W_K$ being removed), and 24 directed edge weights, i.e., $W_{AB}$, $W_{BC}$, $W_{DB}$, $W_{FC}$, $W_{JE}$, $W_{EF}$, $W_{FG}$, $W_{HI}$, $W_{IJ}$, $W_{MI}$, $W_{MJ}$, $W_{LM}$, $W_{MN}$, $W_{UO}$, $W_{OP}$, $W_{TQ}$, $W_{QP}$, $W_{CR}$, $W_{RS}$, $W_{GT}$, $W_{SU}$, $W_{TU}$, $W_{PGV}$ and $W_{UGV}$.

Referring again to FIG. 5, at 340, in certain embodiments, the modularity (e.g., Q) of directed flow graph 500 may be calculated to determine whether directed flow graph 500 may be partitioned into the target number of MPU memory regions (i.e., N). Modularity is a characteristic that indicates the strength to which a network or graph may be divided into clusters or groups. Generally, the modularity may be defined as the fraction of the edges that fall within the given groups minus the expected fraction if edges were distributed at random. The modularity calculation returns an arbitrary number P classes and a coloring for each node (vertex) into one of the P classes. In certain embodiments, when P≥N, the target number of MPU memory regions (i.e., N) may remain the same, and when P≤N, the target number of MPU memory regions (i.e., N) may be decreased to P. In other embodiments, the target number of MPU memory regions (i.e., N) may remain the same.

At 350, directed flow graph 500 is partitioned into a target number of

MPU memory regions based on the partition number N stored in module configuration file 302. In certain embodiments, a multilevel partitioning method may be employed, such as the METIS method, in which (a) directed flow graph 500 is coarsened by generating a sequence of graphs $G_0, G_1, \ldots, G_N$, where $G_0$ is the original graph and for each $0 \leq i \leq j \leq N$, the number of vertices in $G_i$ is greater than the number of vertices in $G_j$; (b) a partition of $G_N$ is computed; and (c) the partition is projected back through the sequence in the order of $G_N, \ldots, G_0$, refining it with respect to each graph. The final partition computed during the last phase is a partition of directed flow graph 500. Other partitioning methods are also contemplated, such as spectral methods, etc.

If directed flow graph 500 is not partitionable into the target number of MPU memory regions, then N is reduced by 1, 2, etc., and the partitioning method is repeated.

Additionally, during partitioning, blacklisted nodes (vertices) may be automatically recolored, and corresponding directed edges may be marked as MPU memory region (partition) boundaries. Node (vertex) weights are normalized in each MPU memory region (partition), and the corresponding delta-perturbation entries in module configuration file 302 are updated with the change in normalized weights. Likewise, "included" directed edge weights, i.e., directed edge weights that are not located on an MPU memory region (partition) boundary, are normalized within each MPU memory region (partition) and module configuration file 302 is updated in a similar fashion. Directed edges between MPU memory regions are marked, but not updated, in module configuration file 302.

As discussed above, each node in directed flow graph 500 represents a function or a global variable, i.e., an element in the object code. Accordingly, after the directed flow graph 500 has been partitioned, each element of the object code may be assigned to the MPU memory region in which the corresponding node has been partitioned. The process then flows to 360.

At 360, each element in the object code, i.e., each element within each object file of object file series 304, is relocated or copied to a new object file within MPU object file series 306 that corresponds to the assigned MPU memory region for that element. MPU object file series 306 includes, for example, memory region object file series 307 (e.g., $r_1.o$, $r_2.o$, $r_N.o$) and unprotected memory region file 308, e.g., unprotected.o.

As discussed above, each marked directed edge between MPU memory regions represents either a function call or a global or shared variable access that crosses a partition boundary. In certain embodiments, prior to relocation at 360, the object file from which the function is called may be retrieved and new object code, such as a "dispatch" stub, may be injected into the object file. Similarly, the object file in which the global or shared variable is accessed may be retrieved and new object code, such as a "getter" stub, may be injected into the object file. The dispatch stub and the getter stub represent entry points to the MPU memory region in which the function or global or shared variable has been assigned.

Generally, the new object code is a delegate method for the function call or global or shared memory access. For a function call, the delegate method may pass intermediate arguments to the terminal function assigned to the other MPU memory region. In one example, the delegate method may copy any input parameters to a temporary MPU memory region, swap MPU memory regions, and then jump to the terminal function while maintaining the same application binary interface (ABI) as the terminal function.

Accordingly, each memory region object file includes the elements of each object file of object file series 304 that have been assigned to that particular MPU memory region. Blacklist functions elements are relocated to the new object file unprotected.o. The configuration information for MPU 124 is collected into mpu configuration file 309, e.g., mpu_config.o.

Figure 8:
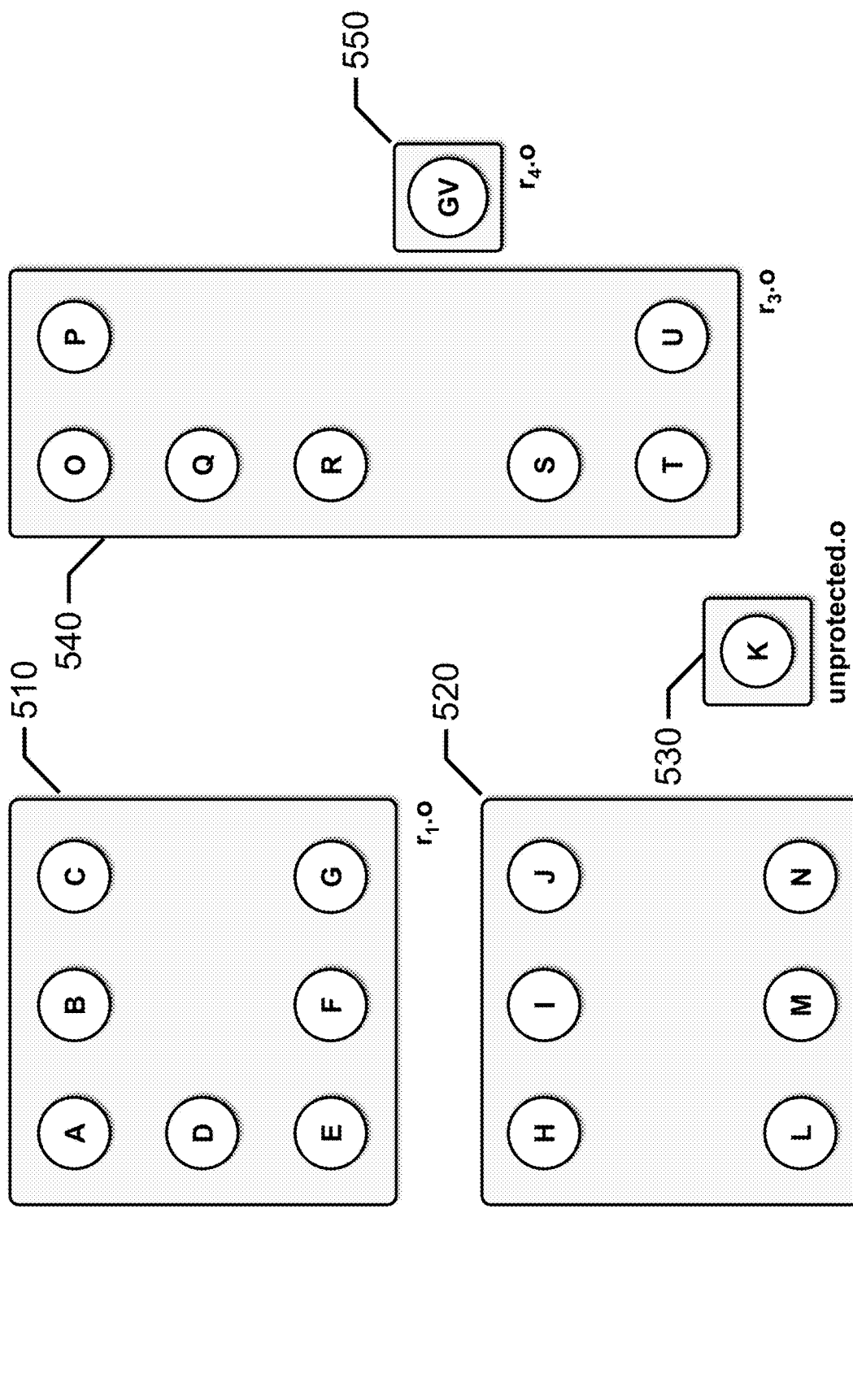
FIG. 8 depicts a partitioned graph, in accordance with an embodiment of the present disclosure.

FIG. 8 depicts partitioned graph 502, in accordance with an embodiment of the present disclosure.

In one embodiment, the partition number N, i.e., the target number of MPU memory regions, is three (3). After partitioning directed flow graph 500, most of the elements of the object files of object file series 304 have been partitioned into three new object files, i.e., $r_1.o$, $r_2.o$ and $r_3.o$, corresponding to MPU memory region 1, MPU memory region 2 and MPU memory region 3. GV 450 has been partitioned into a new object file, i.e., $r_4.o$, corresponding to MPU memory region 4, and one blacklist function (i.e., function K) has been partitioned into a new object file, i.e., unprotected.o, corresponding to an unprotected MPU memory region.

More particularly, for software module A 410, the object code for functions A, B, C, D, E, F and G has been relocated or copied from the original object file, i.e., a.o, to new object file 510, i.e., $r_1.o$. For software module B 420, the object code for functions H, I, J, L, M and N has been relocated or copied from the original object file, i.e., b.o, to new object file 520, i.e., $r_2.o$, and the object code for function K has been relocated to the new object file 530, i.e., unprotected.o. For software module C 430, the object code for functions O, P, Q and R has been relocated or copied from the original object file, i.e., c.o, to new object file 540, i.e., $r_3.o$. Similarly, for software module D 440, the object code for functions S, T and U has been relocated or copied from the original object file, i.e., d.o, to new object file 540, i.e., $r_3.o$. The declarations of the global variables within GV 450 have been relocated or copied to new object file 550, i.e., $r_4.o$. The object code for blacklist function K has been relocated or copied from the original object file, i.e., b.o, to new object file 550, i.e., unprotected.o. In many embodiments, the new object files are ELF format.

In certain embodiments, certain object files of the embedded system software, such as, for example, OS object files, etc., may be directly assigned to one or more additional MPU memory regions that are not included in the target number of MPU memory regions.

The MPU object file series 350 can then be linked normally, and the input to the linking stage is represented by the exit point "L" in flow diagram 300.

Figure 9:
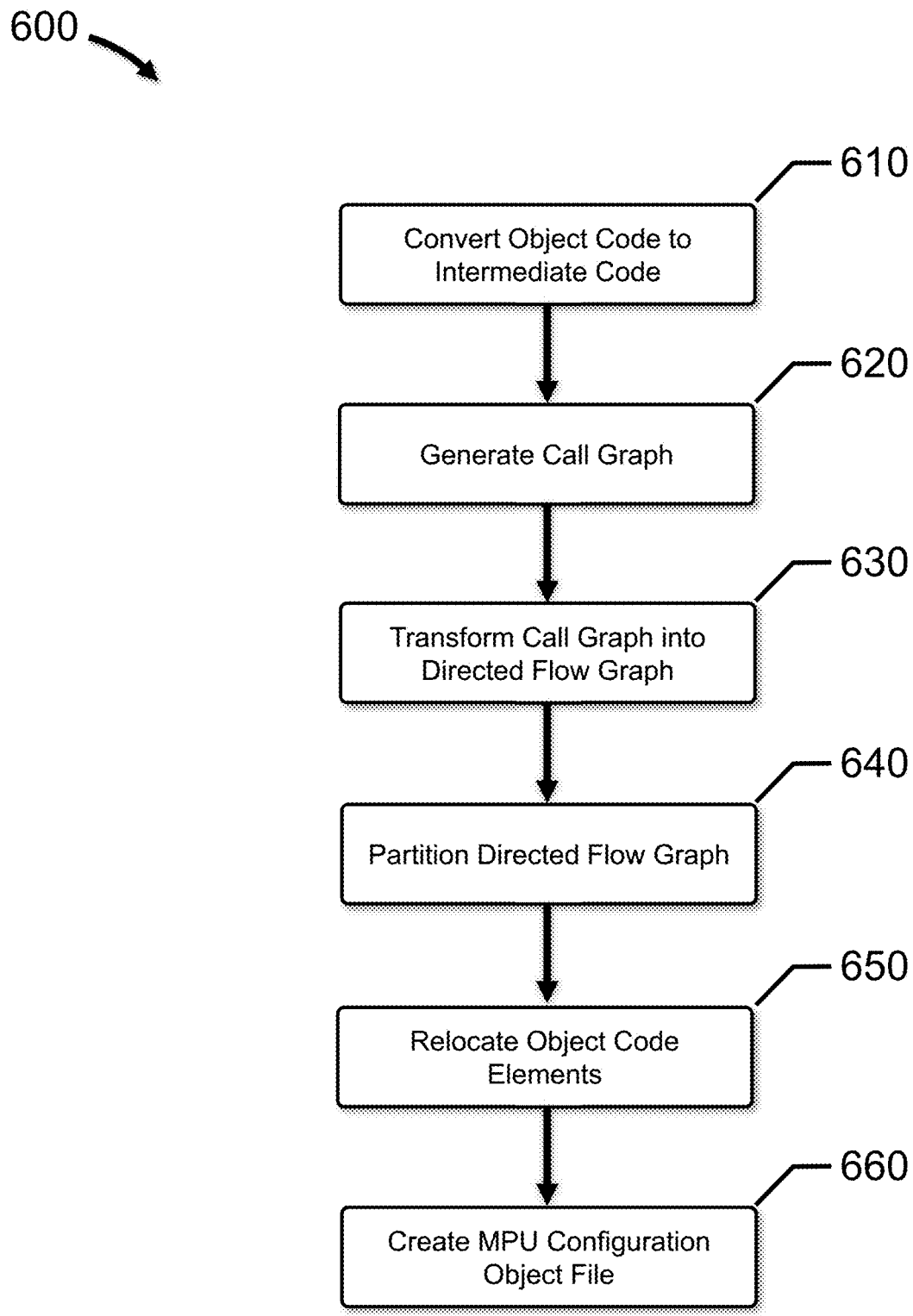
FIG. 9 depicts a flow diagram presenting functionality for partitioning software for an embedded system with an MPU, in accordance with embodiments of the present disclosure.

FIG. 9 depict a flow diagram 600 presenting functionality for partitioning software for an embedded system with an MPU, in accordance with embodiments of the present disclosure.

At 610, object code within a plurality of object files is converted to intermediate code.

At 620, a call graph is generated based on the intermediate code. The call graph includes a plurality of nodes and a plurality of directed edges. Each node represents a function in the intermediate code. Each directed edge connects a source node to a terminal node to represent a source function calling a terminal function. Each node has a weight, and each directed edge has a weight.

At 630, the call graph is transformed into a directed flow graph including updating the node weights and the directed edge weights.

At 640, the directed flow graph is partitioned into a target number of MPU memory regions, which includes assigning each element of the object code to one of the MPU memory regions.

At 650, each element of the object code is relocated to a new object file that corresponds to the assigned MPU memory partition.

At 660, an MPU configuration object file is created. The MPU configuration file includes one or more configuration parameters for each MPU memory region.

As noted above, embodiments of the present disclosure advantageously partition software for an embedded system into a number of MPU memory regions based on the software's object code. More particularly, the partitioning process determines to which MPU memory region each element of each object file is to be assigned, and then relocates each element of each object file to a new object file that corresponds to the assigned MPU memory region. This partitioning process advantageously isolates, to a large extent, the software components in each MPU memory region from one another. This feature improves, inter alia, the security of the embedded system. Additionally, as the embedded software is updated over time, the number and configuration of the MPU memory regions remain stable across software builds, so that small changes in source code yield small changes in the number and configuration of the MPU memory regions. This feature improves, inter alia, the build stability of the embedded system.

The embodiments described herein are combinable.

In one embodiment, a computer-based method for partitioning software for an embedded system with a memory protection unit (MPU) includes converting object code within a plurality of object files to intermediate code; generating a call graph based on the intermediate code, the call graph including a plurality of nodes and a plurality of directed edges, each node representing a function in the intermediate code, each directed edge connecting a source node to a terminal node to represent a source function calling a terminal function, each node having a weight, and each directed edge having a weight; transforming the call graph into a directed flow graph including updating the node weights and updating the directed edge weights; partitioning the directed flow graph into a target number of MPU memory regions, including assigning each element of the object code to one of the MPU memory regions; relocating each element of the object code to a new object file that corresponds to the assigned MPU memory region; and creating an MPU configuration object file that includes one or more configuration parameters for each MPU memory region.

In another embodiment of the method, updating a node weight is based on a size, in bytes, of the object code of the function represented by the node.

In another embodiment of the method, updating a directed edge weight is based on a sum of an input parameter size, in bytes, of the terminal function plus an in-degree parameter value of the terminal function.

In another embodiment of the method, updating a node weight is further based on a delta perturbation parameter of the node weight, and updating a directed edge weight is further based on a delta perturbation parameter of the directed edge weight.

In another embodiment of the method, the delta perturbation parameter of the node weight represents a cost to move the node to a different MPU memory region.

In another embodiment of the method, the method further includes when a node represents a blacklist function, recoloring the node in the directed flow graph, and marking one or more corresponding directed edges as MPU memory region boundaries; and when an element of the object code is a blacklist function, assigning the element to an additional MPU memory region, and relocating the element to a new object file that corresponds to the additional MPU memory region.

In another embodiment of the method, the method further includes for a directed edge that is not located on an MPU memory region boundary, prior to said relocating, injecting new object code into the object file in which the source function is located, the new object code being a stub for the terminal function.

In another embodiment of the method, the method further includes calculating a modularity of the directed flow graph prior to partitioning the object code.

In another embodiment of the method, partitioning the object code includes normalizing the node weights in each MPU memory region; updating the delta perturbations of the node weights based on a change in normalized node weights; normalizing the directed edge weights that are not located on an MPU memory region boundary; and updating the delta perturbations of the directed edge weights based on a change in normalized directed edge weights.

In another embodiment of the method, each global variable in the intermediate code is represented by a node in the call graph; and each access of the global variable by a source node is represented by a directed edge in the call graph.

In one embodiment, a non-transitory computer-readable medium having stored thereon instructions that, when executed by a processor, cause the processor to partition software for an embedded system with a memory protection unit (MPU), the instructions embodying a method including converting object code within a plurality of object files to intermediate code; generating a call graph based on the intermediate code, the call graph including a plurality of nodes and a plurality of directed edges, each node representing a function in the intermediate code, each directed edge connecting a source node to a terminal node to represent a source function calling a terminal function, each node having a weight, and each directed edge having a weight; transforming the call graph into a directed flow graph including updating the node weights and updating the directed edge weights; partitioning the directed flow graph into a target number of MPU memory regions, including assigning each element of the object code to one of the MPU memory regions; relocating each element of the object code to a new object file that corresponds to the assigned MPU memory region; and creating an MPU configuration object file that includes one or more configuration parameters for each MPU memory region.

In another embodiment of the non-transitory computer-readable medium, updating a node weight is based on a size, in bytes, of the object code of the function represented by the node.

In another embodiment of the non-transitory computer-readable medium, updating a directed edge weight is based on a sum of an input parameter size, in bytes, of the terminal function plus an in-degree parameter value of the terminal function.

In another embodiment of the non-transitory computer-readable medium, updating a node weight is further based on a delta perturbation parameter of the node weight, and updating a directed edge weight is further based on a delta perturbation parameter of the directed edge weight.

In another embodiment of the non-transitory computer-readable medium, the delta perturbation parameter of the node weight represents a cost to move the node to a different MPU memory region.

In another embodiment of the non-transitory computer-readable medium, the method further includes when a node represents a blacklist function, recoloring the node in the directed flow graph, and marking one or more corresponding directed edges as MPU memory region boundaries; and when an element of the object code is a blacklist function, assigning the element to an additional MPU memory region, and relocating the element to a new object file that corresponds to the additional MPU memory region.

In another embodiment of the non-transitory computer-readable medium, the method further includes for a directed edge that is not located on an MPU memory region boundary, prior to said relocating, injecting new object code into the object file in which the source function is located, the new object code being a stub for the terminal function.

The non-transitory computer-readable medium of claim 11, where the method further comprises calculating a modularity of the directed flow graph prior to partitioning the object code.

In another embodiment of the non-transitory computer-readable medium, partitioning the object code includes normalizing the node weights in each MPU memory region; updating the delta perturbations of the node weights based on a change in normalized node weights; normalizing the directed edge weights that are not located on an MPU memory region boundary; and updating the delta perturbations of the directed edge weights based on a change in normalized directed edge weights.

In another embodiment of the non-transitory computer-readable medium, each global variable in the intermediate code is represented by a node in the call graph; and each access of the global variable by a source node is represented by a directed edge in the call graph.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A computer-based method for partitioning software for an embedded system with a memory protection unit (MPU), comprising:
  converting object code within a plurality of object files to intermediate code;
  generating a call graph based on the intermediate code, the call graph including a plurality of nodes and a plurality of directed edges, each node representing a function in the intermediate code, each directed edge connecting a source node to a terminal node to represent a source function calling a terminal function, each node having a weight, and each directed edge having a weight;

transforming the call graph into a directed flow graph including updating the node weights and updating the directed edge weights;

partitioning the directed flow graph into a target number of MPU memory regions, including assigning each element of the object code to one of the MPU memory regions;

relocating each element of the object code to a new object file that corresponds to the assigned MPU memory region; and creating an MPU configuration object file that includes one or more configuration parameters for each MPU memory region.

2. The computer-based method of claim 1, where said updating a node weight is based on a size, in bytes, of the object code of the function represented by the node.

3. The computer-based method of claim 2, where said updating a directed edge weight is based on a sum of an input parameter size, in bytes, of the terminal function plus an in-degree parameter value of the terminal function.

4. The computer-based method of claim 3, where said updating a node weight is further based on a delta perturbation parameter of the node weight, and updating a directed edge weight is further based on a delta perturbation parameter of the directed edge weight.

5. The computer-based method of claim 4, where the delta perturbation parameter of the node weight represents a cost to move the node to a different MPU memory region.

6. The computer-based method of claim 5, where said partitioning the object code includes:
normalizing the node weights in each MPU memory region;
updating the delta-perturbations of the node weights based on a change in normalized node weights;
normalizing the directed edge weights that are not located on an MPU memory region boundary; and
updating the delta-perturbations of the directed edge weights based on a change in normalized directed edge weights.

7. The computer-based method of claim 1, further comprising:
when a node represents a blacklist function:
recoloring the node in the directed flow graph, and marking one or more corresponding directed edges as MPU memory region boundaries; and
when an element of the object code is a blacklist function:
assigning the element to an additional MPU memory region, and relocating the element to a new object file that corresponds to the additional MPU memory region.

8. The computer-based method of claim 1, further comprising:
for a directed edge that is not located on an MPU memory region boundary, prior to said relocating, injecting new object code into the object file in which the source function is located, the new object code being a stub for the terminal function.

9. The computer-based method of claim 1, further comprising:
calculating a modularity of the directed flow graph prior to partitioning the object code.

10. The computer-based method of claim 1, where:
each global variable in the intermediate code is represented by a node in the call graph; and
each access of the global variable by a source node is represented by a directed edge in the call graph.

11. A non-transitory computer-readable medium having stored thereon instructions that, when executed by a processor, cause the processor to partition software for an embedded system with a memory protection unit (MPU), the instructions embodying a method comprising:
converting object code within a plurality of object files to intermediate code;
generating a call graph based on the intermediate code, the call graph including a plurality of nodes and a plurality of directed edges, each node representing a function in the intermediate code, each directed edge connecting a source node to a terminal node to represent a source function calling a terminal function, each node having a weight, and each directed edge having a weight;
transforming the call graph into a directed flow graph including updating the node weights and updating the directed edge weights;
partitioning the directed flow graph into a target number of MPU memory regions, including assigning each element of the object code to one of the MPU memory regions;
relocating each element of the object code to a new object file that corresponds to the assigned MPU memory region; and
creating an MPU configuration object file that includes one or more configuration parameters for each MPU memory region.

12. The non-transitory computer-readable medium of claim 11, where said updating a node weight is based on a size, in bytes, of the object code of the function represented by the node.

13. The non-transitory computer-readable medium of claim 12, where said updating a directed edge weight is based on a sum of an input parameter size, in bytes, of the terminal function plus an in-degree parameter value of the terminal function.

14. The non-transitory computer-readable medium of claim 13, where said updating a node weight is further based on a delta perturbation parameter of the node weight, and updating a directed edge weight is further based on a delta perturbation parameter of the directed edge weight.

15. The non-transitory computer-readable medium of claim 14, where the delta perturbation parameter of the node weight represents a cost to move the node to a different MPU memory region.

16. The non-transitory computer-readable medium of claim 15, where said partitioning the object code includes:
normalizing the node weights in each MPU memory region;
updating the delta-perturbations of the node weights based on a change in normalized node weights;
normalizing the directed edge weights that are not located on an MPU memory region boundary; and
updating the delta-perturbations of the directed edge weights based on a change in normalized directed edge weights.

17. The non-transitory computer-readable medium of claim 11, where the method further comprises:
when a node represents a blacklist function:
recoloring the node in the directed flow graph, and marking one or more corresponding directed edges as MPU memory region boundaries; and when an element of the object code is a blacklist function:
assigning the element to an additional MPU memory region, and relocating the element to a new object file that corresponds to the additional MPU memory region.

18. The non-transitory computer-readable medium of claim 11, where the method further comprises:
for a directed edge that is not located on an MPU memory region boundary, prior to said relocating, injecting new object code into the object file in which the source function is located, the new object code being a stub for the terminal function.

19. The non-transitory computer-readable medium of claim 11, where the method further comprises:
calculating a modularity of the directed flow graph prior to partitioning the object code.

20. The non-transitory computer-readable medium of claim 11, where:
each global variable in the intermediate code is represented by a node in the call graph; and
each access of the global variable by a source node is represented by a directed edge in the call graph.

\* \* \* \* \*